(12) United States Patent
Park et al.

(10) Patent No.: US 9,641,299 B2
(45) Date of Patent: May 2, 2017

(54) METHOD FOR REPORTING APERIODIC CHANNEL INFORMATION IN MULTI CELL-BASED WIRELESS COMMUNICATION SYSTEM AND DEVICE THEREFOR

(71) Applicant: LG ELECTRONICS INC., Seoul (KR)

(72) Inventors: Jonghyun Park, Anyang-si (KR); Dongyoun Seo, Anayng-si (KR); Byounghoon Kim, Anayng-si (KR); Hanbyul Seo, Anyang-si (KR); Kijun Kim, Anyang-si (KR); Hyungtae Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 14/415,486

(22) PCT Filed: Jul. 11, 2013

(86) PCT No.: PCT/KR2013/006201
§ 371 (c)(1),
(2) Date: Jan. 16, 2015

(87) PCT Pub. No.: WO2014/021565
PCT Pub. Date: Feb. 6, 2014

(65) Prior Publication Data
US 2015/0207600 A1    Jul. 23, 2015

Related U.S. Application Data

(60) Provisional application No. 61/678,079, filed on Jul. 31, 2012.

(51) Int. Cl.
H04L 5/00    (2006.01)
H04B 7/024    (2017.01)
(Continued)

(52) U.S. Cl.
CPC .......... *H04L 5/0048* (2013.01); *H04B 7/024* (2013.01); *H04L 5/005* (2013.01); *H04L 5/0035* (2013.01);
(Continued)

(58) Field of Classification Search
CPC ..... H04L 5/0048; H04L 5/005; H04L 5/0051; H04L 5/0035; H04L 5/0037; H04W 56/0005; H04B 7/024
See application file for complete search history.

(56) References Cited

U.S. PATENT DOCUMENTS

2010/0202311 A1    8/2010    Lunttila et al.
2010/0238824 A1    9/2010    Farajidana et al.
(Continued)

FOREIGN PATENT DOCUMENTS

KR    10-2011-0002586 A    1/2011
KR    10-2012-0048325 A    5/2012

*Primary Examiner* — Thai Nguyen
(74) *Attorney, Agent, or Firm* — Dentons US LLP

(57) ABSTRACT

The present application discloses a method for enabling a terminal to report channel status information in a base station cooperative wireless communication system. Particularly, the method for enabling a terminal to report channel status information in a base station cooperative wireless communication system comprises the steps of: receiving, from a serving base station, first resource setting information for a channel status information-reference signal (CSI-RS) and second resource setting information for measuring interference: receiving a triggering signal for reporting the channel status information from the serving base station; calculating the channel status information on the serving base station and/or one or more cooperative base stations by using the first resource setting information and the second resource setting information; and reporting the channel status information to the serving base station, wherein the first resource setting information and the second (Continued)

resource setting information include information on an antenna port capable of referring to a large scale property of a wireless channel.

12 Claims, 13 Drawing Sheets

(51) Int. Cl.
*H04W 56/00* (2009.01)
*H04B 7/06* (2006.01)
(52) U.S. Cl.
CPC .......... *H04L 5/0051* (2013.01); *H04L 5/0053* (2013.01); *H04W 56/0005* (2013.01); *H04B 7/0626* (2013.01); *H04L 5/0037* (2013.01)

(56) References Cited

U.S. PATENT DOCUMENTS

| | | | | |
|---|---|---|---|---|
| 2012/0094710 A1* | 4/2012 | Jia | ...................... | H04W 72/044 455/524 |
| 2013/0196675 A1* | 8/2013 | Xiao | ................... | H04W 72/082 455/452.1 |
| 2013/0301448 A1* | 11/2013 | Sayana | ................ | H04W 24/10 370/252 |

* cited by examiner

FIG. 2
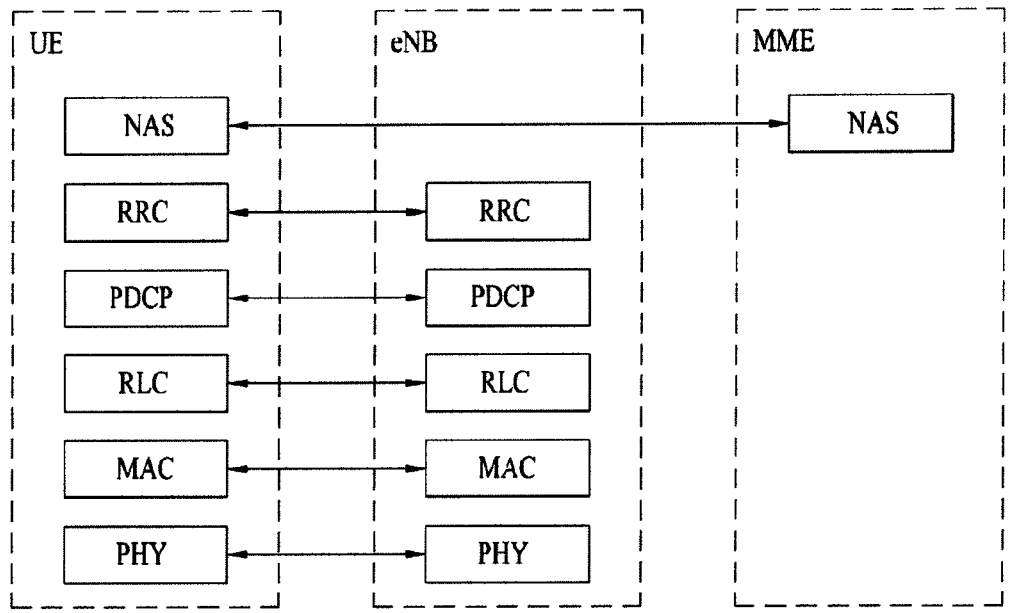
(a) control plane protocol stack
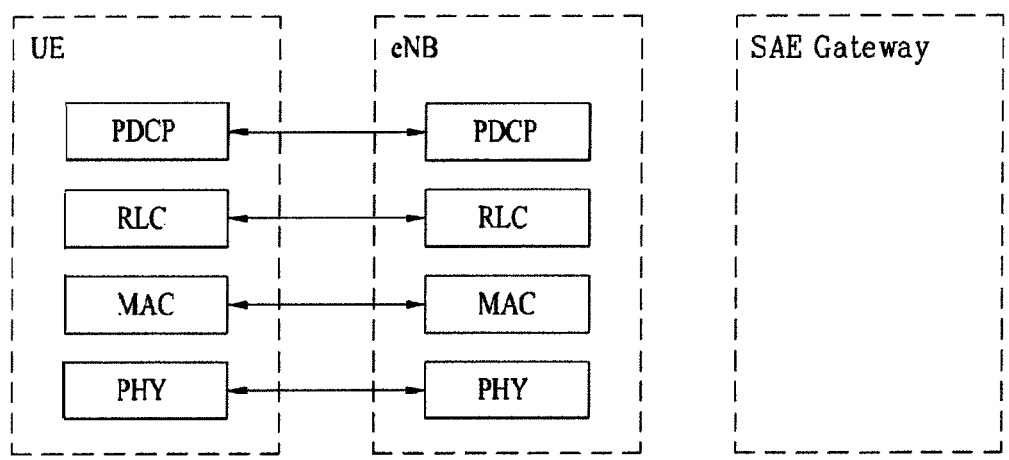
(b) user plane protocol stack ▨ : DMRS group 1

▩ : DMRS group 2

FIG. 11
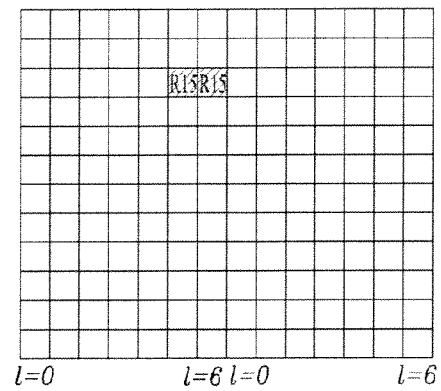
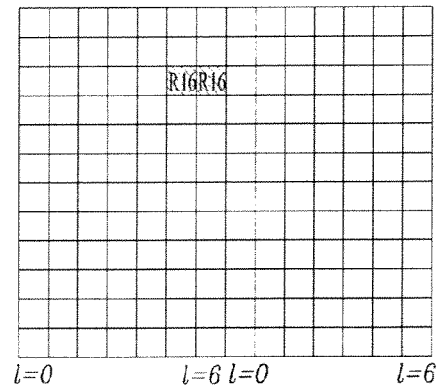
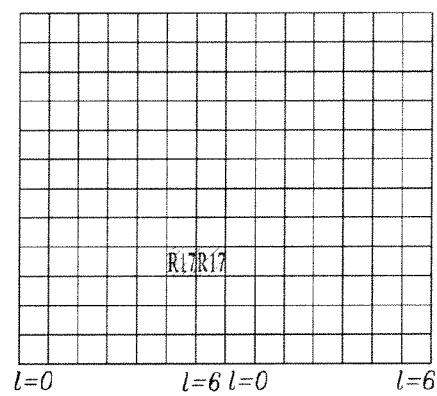
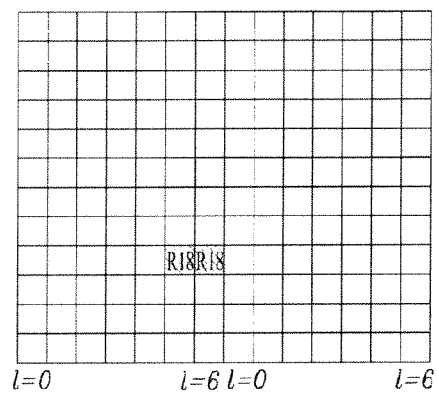
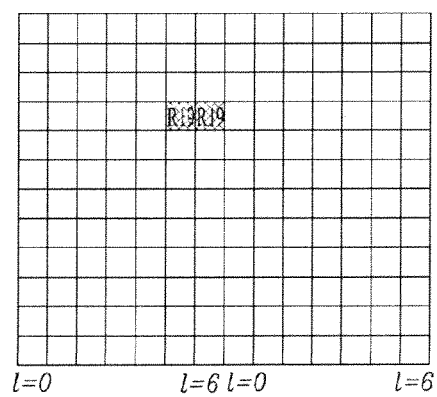
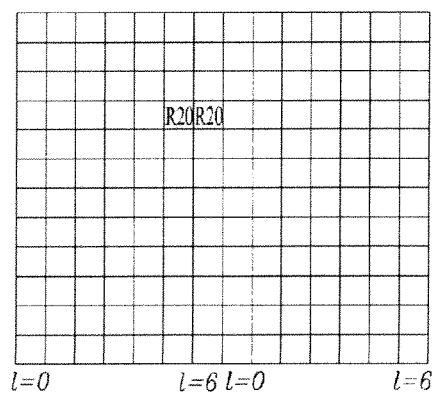
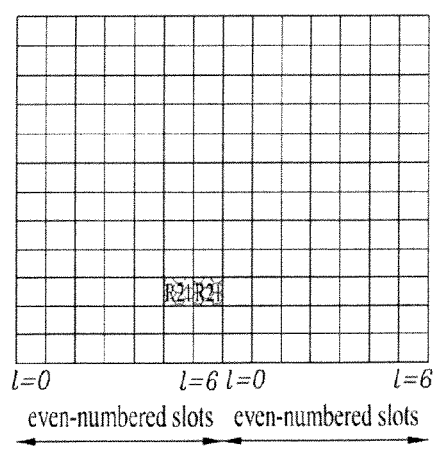
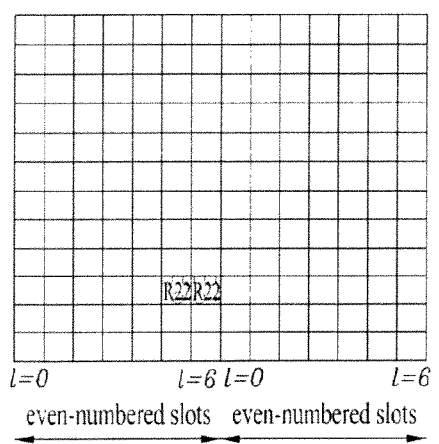

METHOD FOR REPORTING APERIODIC CHANNEL INFORMATION IN MULTI CELL-BASED WIRELESS COMMUNICATION SYSTEM AND DEVICE THEREFOR

This application is a 35 U.S.C. §371 National Stage Entry of International Application No. PCT/KR2013/006201 filed Jul. 11, 2013, which claims benefit of and priority to U.S. Provisional Application No. 61/678,079 filed Jul. 31, 2012, both of which are incorporated by reference for all purposes as if fully set forth herein.

TECHNICAL FIELD

The present invention relates to a wireless communication system, and more particularly, to a method of reporting aperiodic channel status information in a multi cell-based wireless communication system and an apparatus therefore.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of reporting aperiodic channel status information in a multi cell-based wireless communication system and an apparatus therefore in the following description based on the discussion mentioned earlier in the foregoing description.

Technical Solution

To achieve these and other advantages and in accordance with the purpose of the present invention, as embodied and broadly described, according to one embodiment, a method of reporting channel status information at a user equipment in a base station cooperative wireless communication system, includes receiving first resource configuration information for a channel status information-reference signal (CSI-RS) and second resource configuration information for interference measurement from a serving base station, receiving a triggering signal from the serving base station to report the channel status information, calculating the channel status information on at least one of the serving base station and one or more cooperative base stations using the first resource configuration information and the second resource configuration information and reporting the channel status information to the serving base station. The first resource configuration information and the second resource configuration information include information on an antenna port capable of referring a large scale property of a radio channel.

Preferably, the triggering signal indicates one of a plurality of triggering states and a plurality of the triggering states include a state indicating a reporting of the channel status information on a base station that transmits a downlink control channel on a specific frequency band.

More preferably, the second resource configuration information includes resource element information indicating a position of one or more resource elements and the information on the antenna port included in the second resource configuration information corresponds to information on an antenna port of a reference signal assuming that the position of one or more resource elements and the large scale property are identical to each other. In addition, the information on the antenna port included in the first resource configuration information also corresponds to information on an antenna port of a different reference signal assuming that the channel status information-reference signal and the large scale property are identical to each other.

In this case, the large scale property corresponds to information on frequency offset for synchronization tracking and information on timing offset. Specifically, the large scale property includes at least one selected from the group consisting of Doppler spread, Doppler shift, average delay and delay spread.

To further achieve these and other advantages and in accordance with the purpose of the present invention, according to a different embodiment, a terminal device in a base station cooperative wireless communication system includes a wireless communication module configured to transceive a signal with a serving base station and one or more cooperative base stations and a processor configured to process the signal. The wireless communication module is configured to receive first resource configuration information for a channel status information-reference signal (CSI-RS) and second resource configuration information for interference measurement from the serving base station and receive a triggering signal from the serving base station to report the channel status information, the processor is configured to calculate the channel status information on at least one of the serving base station and one or more cooperative base stations using the first resource configuration information and the second resource configuration information and control the wireless communication module to report the channel status information to the serving base station and the first resource configuration information and the second resource configuration information include information on an antenna port capable of referring a large scale property of a radio channel.

Advantageous Effects

According to embodiment of the present invention, it is able to efficiently report aperiodic channel status information in a multi cell-based wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIGS. 2(a) and (b) are diagrams for structures of control and user planes of radio interface protocol between a 3GPP radio access network standard-based user equipment and E-UTRAN;

FIG. 11 is a diagram for an example of a CSI-RS configuration #0 in case of a normal CP among downlink CSI-RS configurations defined by a current 3GPP standard document;

BEST MODE

Mode for Invention

Figure 1:
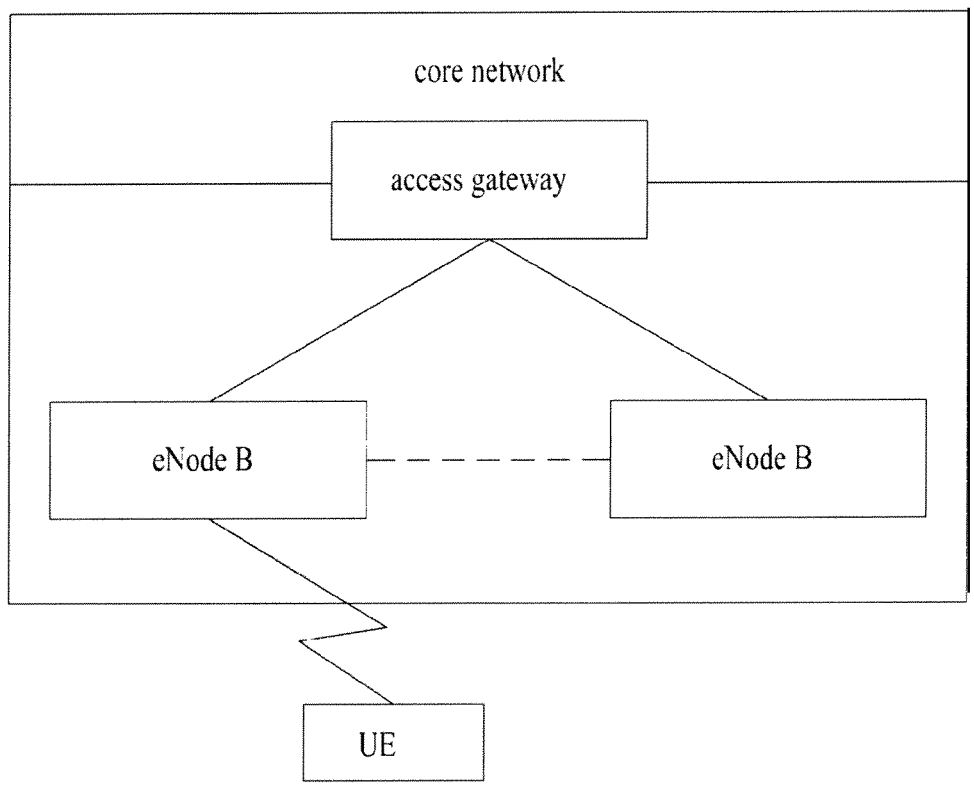
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC.

PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
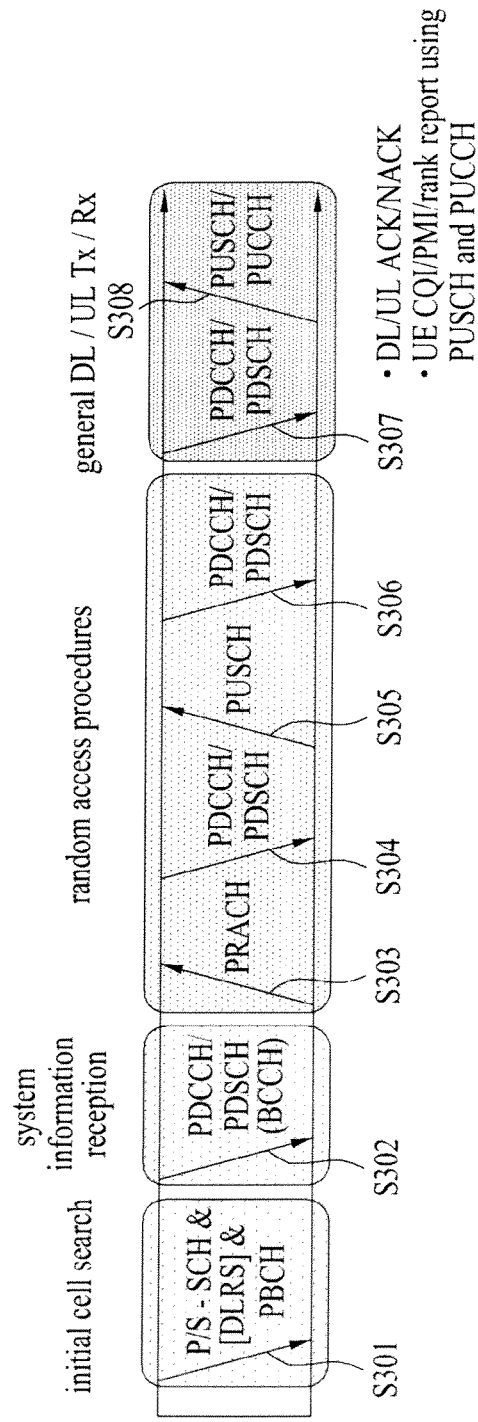
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
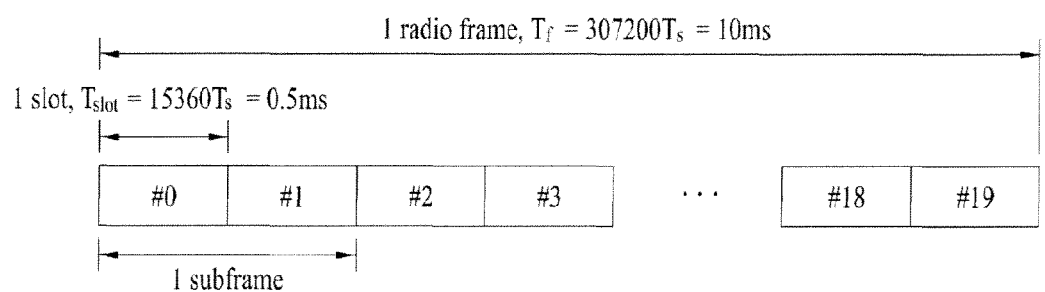
FIG. 4 is a diagram for a structure of a radio frame in LTE system.

FIG. 4 is a diagram for a structure of a radio frame in LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
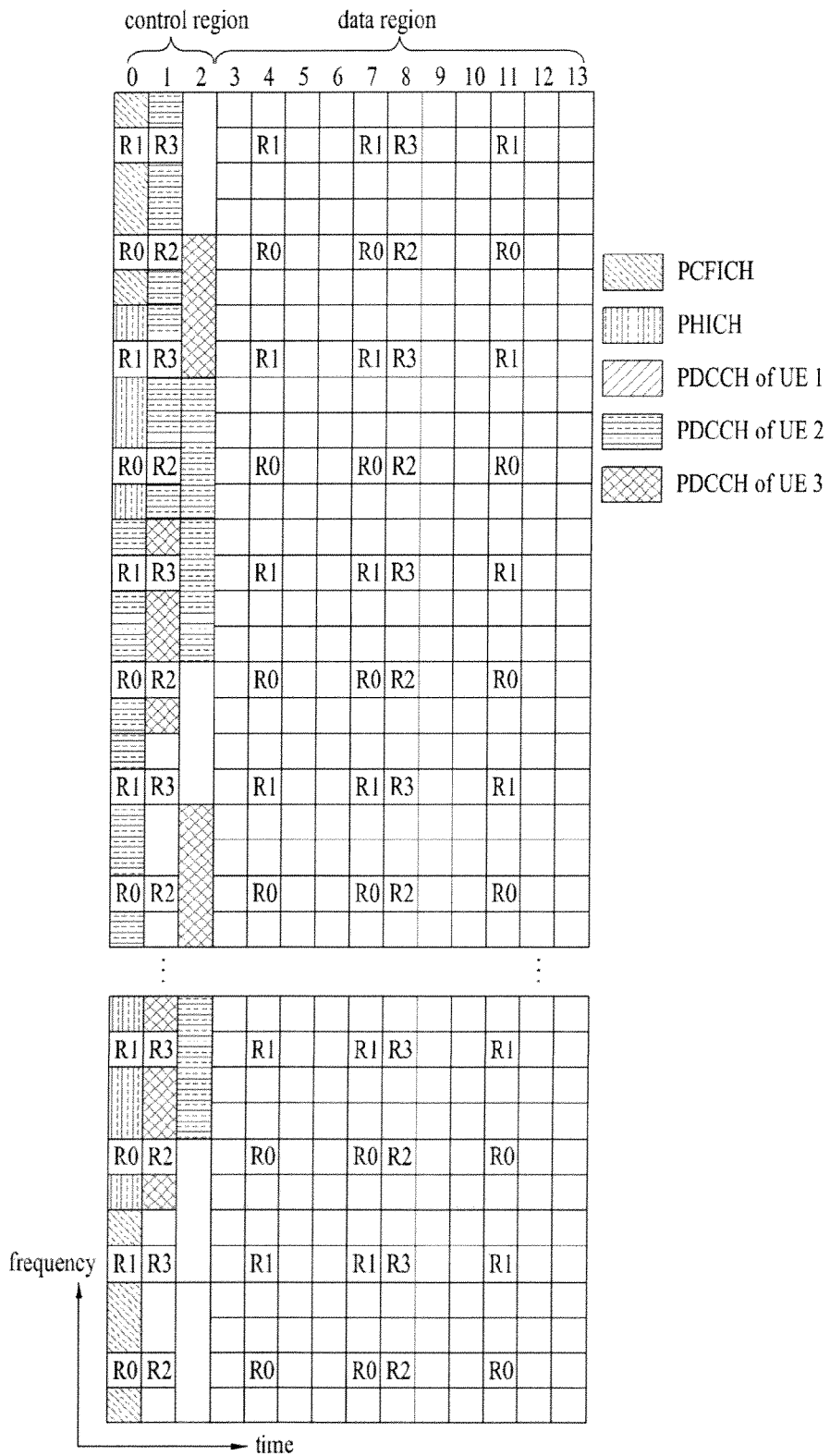
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
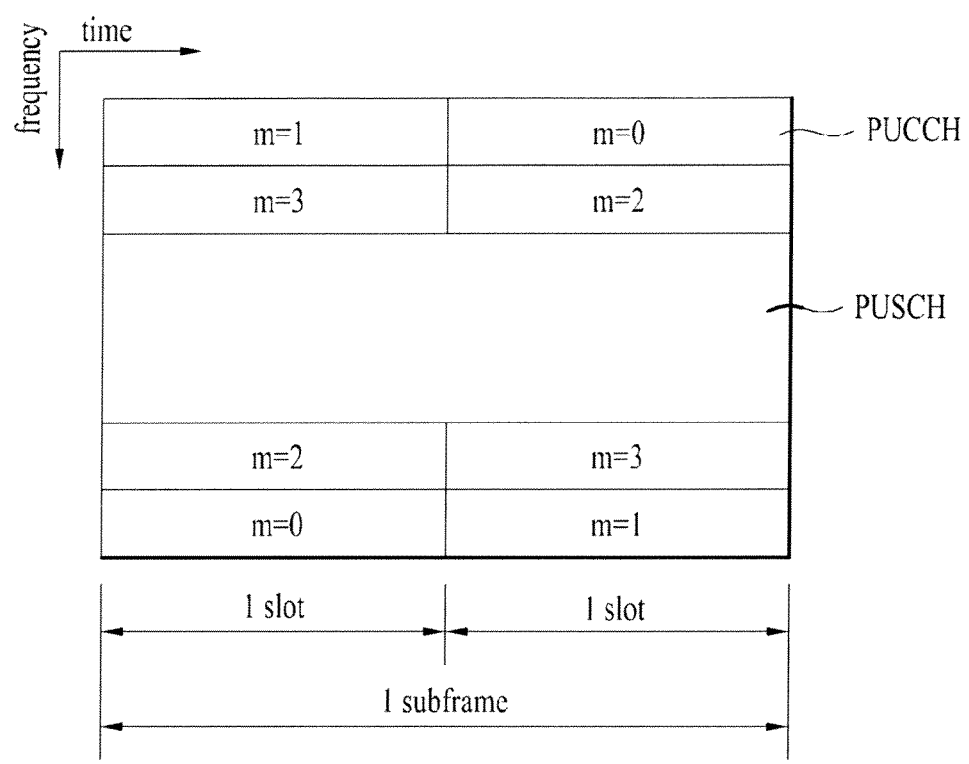
FIG. 6 is a diagram for a structure of an uplink subframe frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
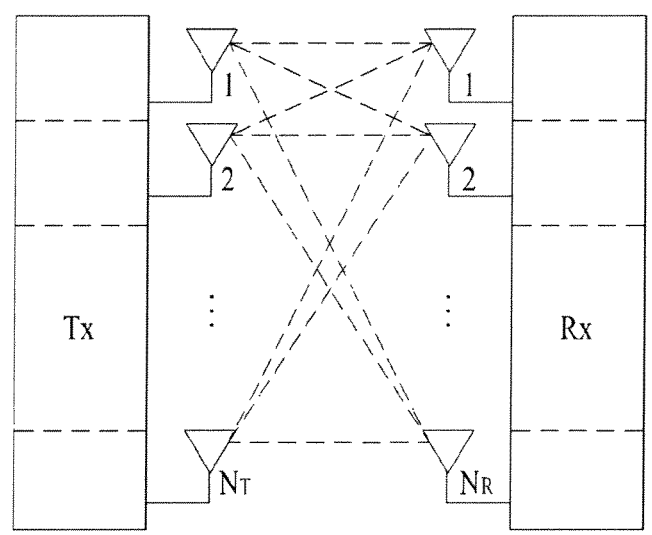
FIG. 7 is a diagram for a configuration of a multiple antenna communication system.

A block diagram of a general multi-antenna (MIMO) communication system is depicted in FIG. 7.

$N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$ as shown in the following Formula 1. In this case, the $R_i$ is a smaller value of the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \qquad \text{[Formula 2]}$$

Meanwhile, for each of the transmission informations, $s_1$, $s_2$, ..., $s_{N_T}$, a transmit power may be differentiated according to the each of the transmission informations. In this case, if each of the transmit powers is represented as $P_1$, $P_2$, ..., $P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix $\backslash\backslash$ to the adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The $\backslash\backslash$ is called the weighted matrix or a precoding matrix.

$$x = \begin{bmatrix} x_1 \\ x_2 \\ \vdots \\ x_i \\ \vdots \\ x_{N_T} \end{bmatrix} \qquad \text{[Formula 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \qquad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \qquad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) scheme, which is not supported by the conventional standard, to enhance a data transmission rate. In this case, the CoMP scheme is a transmission scheme for two or more base stations or cells to communicate with the user equipment in a manner of cooperating with each other to enhance a communication performance between the user equipment situated at a radio shadow zone and the base station (a cell or a sector).

The CoMP transmission scheme can be classified into a join processing (CoMP-joint processing, CoMP-JP) scheme in the form of a cooperative MIMO via data sharing and a coordinated scheduling/beamforming (CoMP-coordinated scheduling/beamforming, CoMP-CS/CB) scheme.

According to the joint processing (CoMP-JP) scheme in DL, a user equipment may be able to instantaneously receive data simultaneously from each of the base stations performing the CoMP transmission scheme. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission scheme (Dynamic Point Selection (DPS)). On the other hand, according to the coordinated scheduling/ beamforming scheme (CoMP-CS/CB), the user equipment may be able to instantaneously receive data from a single base station, i.e., serving base station, via a beamforming.

According to the joint processing (CoMP-JP) scheme in UL, each of the base stations may be able to simultaneously receive PUSCH signal from the user equipment (Joint Reception (JR)). On the other hand, according to the coordinated scheduling/beamforming scheme (CoMP-CS/CB), only a single base station may be able to receive the PUSCH. In this case, the decision to use the coordinated scheduling/ beamforming scheme is determined by the coordinating cells (or base stations).

In the following description, a reference signal is explained in more detail.

In general, a reference signal, which is already known to both a transmitting end and a receiving end, is transmitted from the transmitting end to the receiving end together with data to measure a channel. The reference signal plays not only a role of measuring a channel but also a role of making a demodulation process to be performed in a manner of informing the receiving end of a modulation scheme. The reference signal is classified into a dedicated reference signal (DRS) used for an eNB and a specific user equipment (i.e., UE-specific reference signal) and a cell-specific reference signal used for all UEs in a cell (i.e., common reference signal or cell specific RS (CRS)). The cell-specific reference signal includes a reference signal used for reporting CQI/ PMI/RI to an eNB in a manner of measuring CQI/PMI/RI in a user equipment. This sort of reference signal is called a CSI-RS (channel state information-RS).

Figure 8:
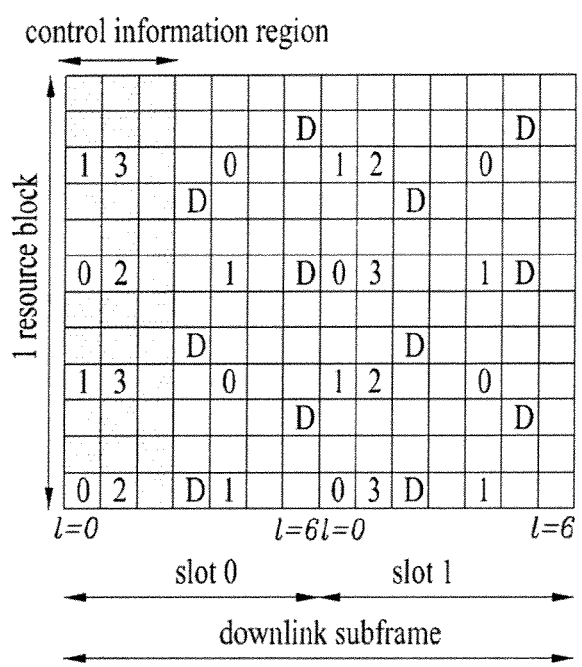
FIG. 8 and FIG. 9 are diagrams for a structure of a downlink reference signal in LTE system supportive of downlink transmission using 4 antennas.
Figure 9:
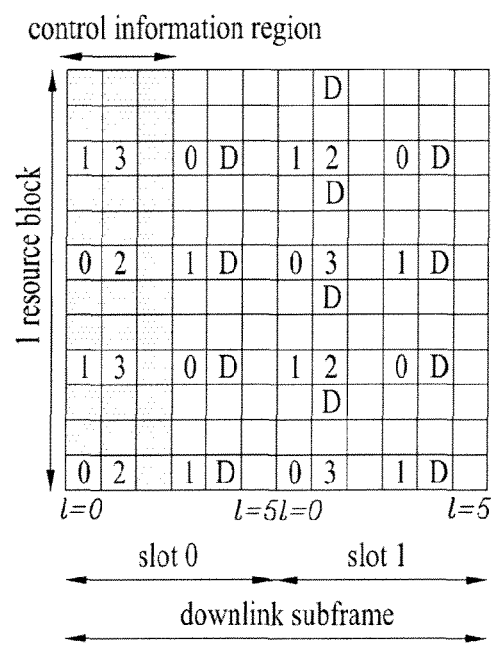

FIG. 8 and FIG. 9 are diagrams of a structure of a reference signal in LTE system supportive of downlink transmission using 4 antennas. In particular, FIG. 8 shows a case of a normal cyclic prefix and FIG. 9 shows a case of an extended cyclic prefix.

Referring to FIG. 8 and FIG. 9, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'D' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 8 and FIG. 9 show an example of the DM-RS corresponding to an antenna port 5. The DM-RSs corresponding to an antenna port 7 to 14, i.e., total 8 antenna ports, are also defined by 3GPP standard document 36.211.

Figure 10:
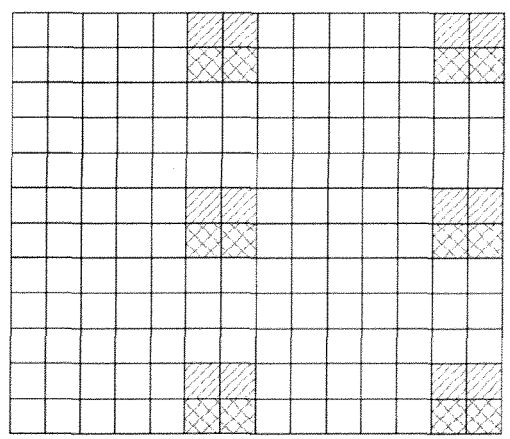
FIG. 10 is a diagram for an example of assigning a downlink DM-RS defined by a current 3GPP standard document.

FIG. 10 is a diagram for an example of assigning a downlink DM-RS defined by a current 3GPP standard document.

Referring to FIG. 10, DM-RSs corresponding to antenna ports {7, 8, 11, 13} are mapped to a DM-RS group 1 using a sequence according to an antenna port and DM-RSs corresponding to antenna ports {9, 10, 12, 14} are mapped to a DM-RS group 2 using a sequence according to an antenna port as well.

Meanwhile, the aforementioned CSI-RS is proposed to perform channel measurement for PDSCH irrespective of a CRS. Unlike the CRS, the CSI-RS can be defined by maximum 32 CSI-RS configurations different from each other to reduce inter-cell interference (ICI) in a multicell environment.

A CSI-RS (resource) configuration varies according to the number of antenna ports. A CSI-RS is configured to be transmitted by a (resource) configuration as different as possible between neighboring cells. Unlike the CRS, the CSI-RS supports maximum 8 antenna ports. According to 3GPP standard document, total 8 antenna ports (antenna port 15 to antenna port 22) are assigned as the antenna port for the CSI-RS. Table 1 and Table 2 in the following show CSI-RS configurations defined by the 3GPP standard document. In particular, Table 1 shows CSI-RS configurations in case of a normal CP and Table 2 shows CSI-RS configurations in case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |

TABLE 1-continued

| | | Number of CSI reference signals configured | | | | | |
|---|---|---|---|---|---|---|---|
| CSI reference signal | | 1 or 2 | | 4 | | 8 | |
| configuration | | (k', l') | $n_s$ mod 2 | (k', l') | $n_s$ mod 2 | (k', l') | $n_s$ mod 2 |
| Frame structure | 12 | (5.2) | 1 | | | | |
| | 13 | (4.2) | 1 | | | | |
| | 14 | (3.2) | 1 | | | | |
| | 15 | (2.2) | 1 | | | | |
| | 16 | (1.2) | 1 | | | | |
| | 17 | (0.2) | 1 | | | | |
| | 18 | (3.5) | 1 | | | | |
| | 19 | (2.5) | 1 | | | | |
| | 20 | (11.1) | 1 | (11.1) | 1 | (11.1) | 1 |
| | 21 | (9.1) | 1 | (9.1) | 1 | (9.1) | 1 |
| | 22 | (7.1) | 1 | (7.1) | 1 | (7.1) | 1 |
| | 23 | (10.1) | 1 | (10.1) | 1 | | |
| | 24 | (8.1) | 1 | (8.1) | 1 | | |
| | 25 | (6.1) | 1 | (6.1) | 1 | | |
| | 26 | (5.1) | 1 | | | | |
| | 27 | (4.1) | 1 | | | | |
| | 28 | (3.1) | 1 | | | | |
| | 29 | (2.1) | 1 | | | | |
| | 30 | (1.1) | 1 | | | | |
| | 31 | (0.1) | 1 | | | | |

TABLE 2

| | | Number of CSI reference signals configured | | | | | |
|---|---|---|---|---|---|---|---|
| CSI reference signal | | 1 or 2 | | 4 | | 8 | |
| configuration | | (k', l') | $n_s$ mod 2 | (k', l') | $n_s$ mod 2 | (k', l') | $n_s$ mod 2 |
| Frame structure type 1 and 2 | 0 | (11.4) | 0 | (11.4) | 0 | (11.4) | 0 |
| | 1 | (9.4) | 0 | (9.4) | 0 | (9.4) | 0 |
| | 2 | (10.4) | 1 | (10.4) | 1 | (10.4) | 1 |
| | 3 | (9.4) | 1 | (9.4) | 1 | (9.4) | 1 |
| | 4 | (5.4) | 0 | (5.4) | 0 | | |
| | 5 | (3.4) | 0 | (3.4) | 0 | | |
| | 6 | (4.4) | 1 | (4.4) | 1 | | |
| | 7 | (3.4) | 1 | (3.4) | 1 | | |
| | 8 | (8.4) | 0 | | | | |
| | 9 | (6.4) | 0 | | | | |
| | 10 | (2.4) | 0 | | | | |
| | 11 | (0.4) | 0 | | | | |
| | 12 | (7.4) | 1 | | | | |
| | 13 | (6.4) | 1 | | | | |
| | 14 | (1.4) | 1 | | | | |
| | 15 | (0.4) | 1 | | | | |
| Frame structure type 2 only | 16 | (11.1) | 1 | (11.1) | 1 | (11.1) | 1 |
| | 17 | (10.1) | 1 | (10.1) | 1 | (10.1) | 1 |
| | 18 | (9.1) | 1 | (9.1) | 1 | (9.1) | 1 |
| | 19 | (5.1) | 1 | (5.1) | 1 | | |
| | 20 | (4.1) | 1 | (4.1) | 1 | | |
| | 21 | (3.1) | 1 | (3.1) | 1 | | |
| | 22 | (8.1) | 1 | | | | |
| | 23 | (7.1) | 1 | | | | |
| | 24 | (6.1) | 1 | | | | |
| | 25 | (2.1) | 1 | | | | |
| | 26 | (1.1) | 1 | | | | |
| | 27 | (0.1) | 1 | | | | |

In Table 1 and Table 2, (k', l') indicates an RE index, k' indicates an subcarrier index and l' indicates an OFDM symbol index. FIG. 11 shows an example of a CSI-RS configuration #0 in case of a normal CP among CSI-RS configurations defined by current 3GPP standard document.

And, it may define a CSI-RS subframe configuration. The CSI-RS subframe configuration consists of a period ($T_{CSI-RS}$) represented in a subframe unit and a subframe offset ($\Delta_{CSI-RS}$). Table 3 in the following shows CSI-RS subframe configurations defined by 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |

TABLE 3-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 15-34 | 20 | $I_{CSI-RS}$-15 |
| 35-74 | 40 | $I_{CSI-RS}$-35 |
| 75-154 | 80 | $I_{CSI-RS}$-75 |

Currently, information on a ZP (zero-power) CSI-RS is transmitted in a manner of being included in a CSI-RS-Config-r10 message via an RRC layer signal in a form shown in Table 4 in the following. In particular, ZP CSI-RS resource configuration consists of zeroTxPowerSubframe-Config-r10 and zeroTxPowerResourceConfigList-r10 corresponding to a bitmap of 16-bit size. In this case, the zeroTxPowerSubframeConfig-r10 informs a transmission period of the ZP CSI-RS and a subframe offset via Error! Objects cannot be created from editing field codes. value shown in Table 3. The zeroTxPowerResourceConfigList-r10 corresponds to information informing ZP CSI-RS configuration. Each element of the bitmap indicates configurations included in a column including 4 antenna ports for a CSI-RS in Table 1 or Table 2. In particular, according to a current 3GPP standard document, a ZP CSI-RS is defined only for a case that there exist 4 antenna ports for a CSI-RS.

TABLE 4

```
--ASN1START
CSI-RS-Config-r10 ::=   SEQUENCE {
    csi-RS-r10              CHOICE {
        ...
    }
    zeroTxPowerCSI-RS-r10   CHOICE {
        release                                 NULL,
        setup                                   SEQUENCE {
            zeroTxPowerResourceConfigList-r10   BIT STRING (SIZE (16)).
            zeroTxPowerSubframeConfig-r10       INTEGER (0..154)
        }
    }
}
--ASN1STOP
```

Meanwhile, an operation of calculating CQI via interference measurement is explained in the following. For reference, according to a current 3GPP standard document, a CQI index, a modulation order corresponding to the CQI index, a coding rate and the like are shown in Table 5 in the following.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

It is necessary for a user equipment to calculate SINR as a necessary factor in case of calculating CQI. In this case, reception power measurement (S-measure) of a desired signal can be performed using such an RS as a NZP CSI-RS and the like. For interference power measurement (I-measure or IM (interference measurement)), it is able to measure power of an interference signal of which the desired signal is eliminated from the received signal.

Subframe sets ($C_{CSI,0}$ and $C_{CSI,1}$) for CSI measurement can be configured by upper layer signaling. A subframe corresponding to each of the subframe sets is included in a single set only without being overlapped with each other. In this case, a UE can perform the S-measure via such an RS as a CSI-RS and the like without any subframe restriction. Yet, in case of performing the I-measure, a UE should perform the I-measure according to $C_{CSI,0}$ and $C_{CSI,1}$, respectively. Hence, the UE should perform a different CQI calculation two times for each of the $C_{CSI,0}$ and the $C_{CSI,1}$.

Meanwhile, as various devices requiring high data transmission capacity are emerged and disseminated, data requisites for a cellular network are rapidly increasing in a current wireless communication environment. In order to satisfy high data requisite, communication technologies are developing to a carrier aggregation technology for efficiently using more frequency bands, a multi-antenna technology used for increasing data capacity in a limited frequency, a multi-base station cooperation technology, and the like and the communication environment is evolving in a manner that density of an accessible node is growing in the vicinity of a user.

A system equipped with the node of high density may have higher system performance by means of cooperation between nodes. Compared to a node operating as an independent base station, the aforementioned scheme may have superior performance.

Figure 12:
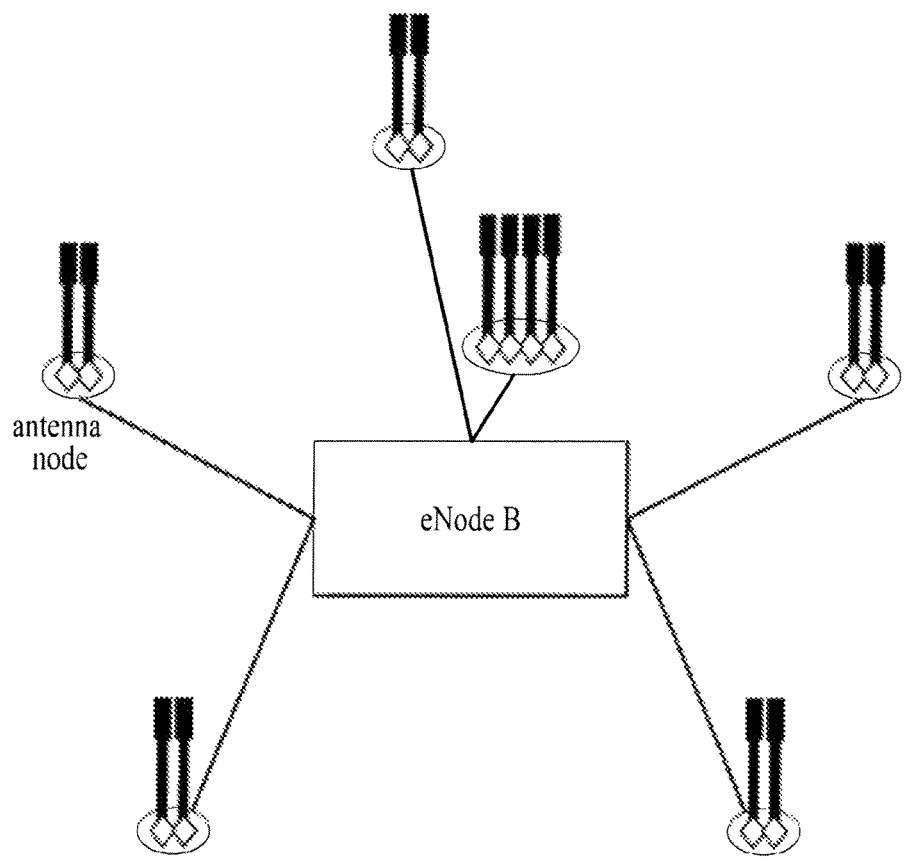
FIG. 12 is a diagram for an example of a multi node system in a next generation communication system.

FIG. 12 is a diagram for an example of a multi node system in a next generation communication system.

Referring to FIG. 12, if an individual node operates as a part of antenna group of a cell in a manner that a controller manages transmission and reception of all nodes, it may correspond to a distributed multi node system (DMNS) that forms a single cell. In this case, each of the individual nodes may receive a separate node ID or may operate as a part of antenna within the cell without a separate Node ID. Yet, if nodes have a cell identifier (ID) different from each other, it may correspond to a multi-cell system. If a multi cell is configured by a duplicated form according to coverage, this is called a multi-tier network.

Meanwhile, a Node-B, an eNode-B, a PeNB, a HeNB, an RRH (remote radio head), a relay, a distributed antenna, and the like may become a node and at least one antenna is installed in a node. A node is also called a transmission point. In general, a node indicates an antenna group apart from each other more than a prescribed space, the present invention defines and applies a node as a random antenna group irrespective of a space.

With the help of the introduction of the aforementioned multi-node system, application of various communication schemes is enabled and channel quality enhancement can be performed. Yet, in order to apply the aforementioned MIMO scheme and inter-cell cooperation communication scheme to a multi-node environment, an introduction of a new control channel is required. To this end, a control channel considered as the newly introduced control channel, which corresponds to an E-PDCCH (enhanced-PDCCH), is under discussion. This channel is determined to be assigned to a data region (hereinafter described as PDSCH region) instead of a legacy control region (hereinafter described as PDCCH region). Consequently, control information on a node can be transmitted according to each UE via the E-PDCCH. Hence, a problem of shortage of the legacy PDCCH region can be solved as well. For reference, the E-PDCCH is not provided to a legacy UE. Instead, an LTE-A UE can receive the E-PDCCH only.

Figure 13:
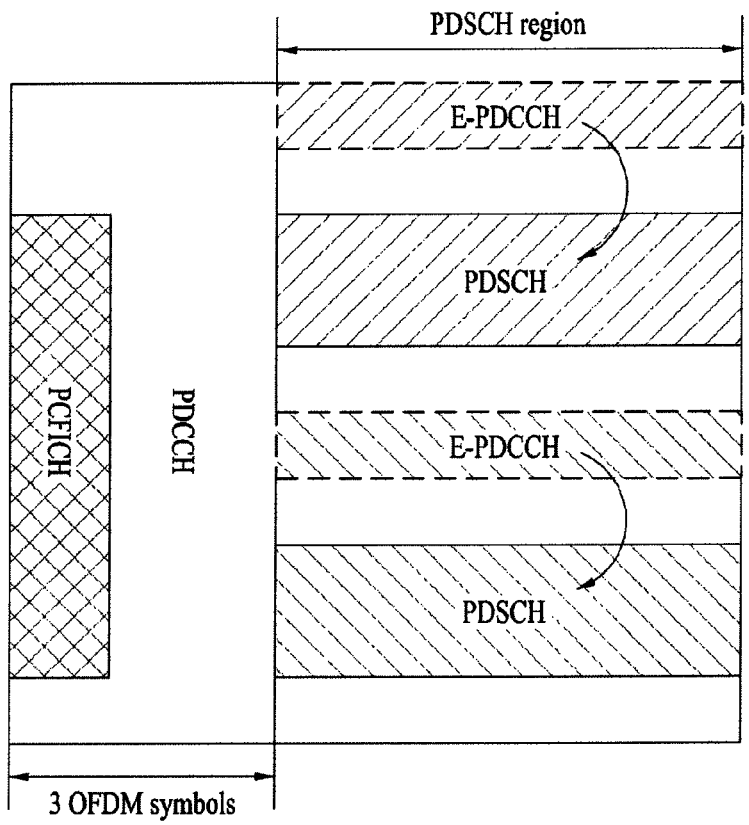
FIG. 13 is a diagram for an example of E-PDCCH and PDSCH scheduled by the E-PDCCH.

FIG. 13 is a diagram for an example of E-PDCCH and PDSCH scheduled by the E-PDCCH.

Referring to FIG. 13, in general, E-PDCCH can be used by defining a part of a PDSCH region carrying data and a user equipment should perform a process of blind decoding to detect whether there exist E-PDCCH of the user equipment. Although E-PDCCH performs a scheduling operation (i.e., PDSCH, PUSCH control) identical to a scheduling operation of a legacy PDCCH, if the number of user equipments, which have accessed such a node as an RRH, increases, greater number of E-PDCCHs are assigned to the inside of the PDSCH region. As a result, the number of blind decoding performed by the user equipment increases and complexity may be getting higher.

In the following, examples of a transmission mode of a downlink data channel are explained.

As shown in Table 6 and Table 7 in the following, a current 3GPP LTE standard document, specifically, 3GPP TS 36.213 document defines downlink data channel transmission modes. The transmission modes shown in the following are set to a UE via upper layer signaling, i.e., RRC signaling.

TABLE 6

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFM subframe: Single-antenna port, port 7 |
|  | DCI format 2D | Up to 8 layer transmission, ports 7-14 or single-antenna port, port 7 or 8 |

TABLE 7

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Transmit diversity |
| Mode 4 | DCI format 1A | Transmit diversity |
|  | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
|  | DCI format 1 | Single-antenna port, port 5 |
| Mode 8 | DCI format 1A | Single-antenna port, port 7 |
|  | DCI format 2B | Single-antenna port, port 7 or 8 |
| Mode 9 | DCI format 1A | Single-antenna port, port 7 |
|  | DCI format 2C | Single-antenna port, port 7 or 8, |
| Mode 10 | DCI format 1A | Single-antenna port, port 7 |
|  | DCI format 2D | Single-antenna port, port 7 or 8, |

Referring to Table 6 and Table 7, in a current 3GPP LTE standard document, downlink control information (DCI) formats are defined according to a type of RNTI masked on PDCCH. In particular, in case of a C-RNTI and an SPS C-RNTI, the current 3GPP LTE standard document shows a transmission mode and a DCI format corresponding to the transmission mode, i.e., a transmission mode-based DCI format. And, a DCI format 1A for a Fall-back mode, which is applicable irrespective of a transmission mode, is defined in the current 3GPP LTE standard document. Table 6 shows an example that the type of RNTI masked on PDCCH corresponds to C-RNTI and Table 7 shows an example that the type of RNTI masked on PDCCH corresponds to SPS C-RNTI.

As an operation example of a transmission mode, if a user equipment performs blind decoding on PDCCH masked with C-RNTI shown in Table 6 and a DCI format 1B is detected as a result of the blind decoding, PDSCH is decoded under an assumption that PDSCH is transmitted using a closed loop spatial multiplexing scheme using a single layer.

In Table 6 and 7, a transmission mode 10 may indicate a downlink data channel transmission mode of the aforementioned CoMP transmission scheme. For instance, if a user equipment performs blind decoding on PDCCH masked with C-RNTI shown in Table 6 and a DCI format 2D is detected as a result of the blind decoding, PDSCH is decoded under an assumption that PDSCH is transmitted using a multi-layer transmission scheme based on an antenna port 7 to 14, i.e., DM-RS. Or, PDSCH is decoded under an assumption that PDSCH is transmitted using a single antenna transmission scheme based on a DM-RS antenna port 7 or 8.

On the contrary, if a user equipment performs blind decoding on PDCCH masked with C-RNTI and a DCI format 1A is detected as a result of the blind decoding, a transmission mode varies according to whether a subframe corresponds to an MBSFN subframe. For instance, if the subframe corresponds to a non-MBSFN subframe, PDSCH is decoded under an assumption that PDSCH is transmitted using a single antenna transmission scheme based on a CRS of an antenna port 0 or PDSCH is transmitted using a transmit diversity scheme based on a CRS. If the subframe corresponds to a MBSFN subframe, PDSCH can be decoded under an assumption that PDSCH is transmitted using a single antenna transmission scheme based on a DM-RS of an antenna port 7.

In the following, QCL (Quansi Co-Location) between antenna ports is explained.

QCL between antenna ports means that some or all of large-scale properties of a signal (or a radio channel corresponding to an antenna port) received from a single antenna port by a user equipment are identical to large-scale properties of a signal (or a radio channel corresponding to an antenna port) received from a different single antenna port. In this case, the large-scale properties include Doppler spread related to a frequency offset, Doppler shift, average delay related a timing offset, delay spread and the like. Moreover, the large-scale properties may include an average gain as well.

According to the aforementioned definition, a user equipment is unable to assume that the large-scale properties are identical to each other between non-QCL antenna ports, i.e., between NQCL (Non Quansi Co-Located)) antenna ports. In this case, a user equipment should independently perform a tracking procedure to obtain a frequency offset, a timing offset and the like according to an antenna port.

On the contrary, there is a merit in that a user equipment can perform following operations between QCL antenna ports.

1) A user equipment can identically apply a power-delay profile for a radio channel corresponding to a specific antenna port, delay spread, Doppler spectrum and a Doppler spread estimation result to a Wiener filter parameter and the like, which are used in case of estimating a radio channel corresponding to a different antenna port.

2) And, after time synchronization and frequency synchronization for the specific antenna port are obtained, a user equipment can apply identical synchronization to a different antenna port.

3) Lastly, regarding an average gain, a user equipment can average RSRP (reference signal received power) measurement values measured for each of QCL antenna ports.

For instance, if a user equipment receives DMRS-based downlink data channel scheduling information, e.g., a DCI format 2C, via PDCCH (or E-PDCCH), it is assumed that the user equipment performs channel estimation for PDSCH via a DM-RS sequence indicated by the scheduling information and performs data demodulation.

In this case, if a DM-RS antenna port used for a user equipment to demodulate a downlink data channel is Quansi co-located (QCL) with a CRS antenna port of a serving cell, the user equipment applies large-scale properties of a radio channel estimated via a CRS antenna port of the user equipment as it is in case of estimating a channel via the DM-RS antenna port. By doing so, it is able to enhance reception performance of a DMRS-based downlink data channel.

Similarly, if a DM-RS antenna port used for a user equipment to demodulate a downlink data channel is Quansi co-located (QCL) with a CSI-RS antenna port of a serving cell, the user equipment applies large-scale properties of a radio channel estimated via the CSI-RS antenna port of the serving cell as it is in case of estimating a channel via the DM-RS antenna port. By doing so, it is able to enhance reception performance of a DMRS-based downlink data channel.

The present invention proposes a CoMP aperiodic CSI (A-CSI) reporting scheme that a UE performs feedback on channel status information (CSI) of each cell in a CoMP measurement set via PUSCH for a CoMP operation.

Figure 14:
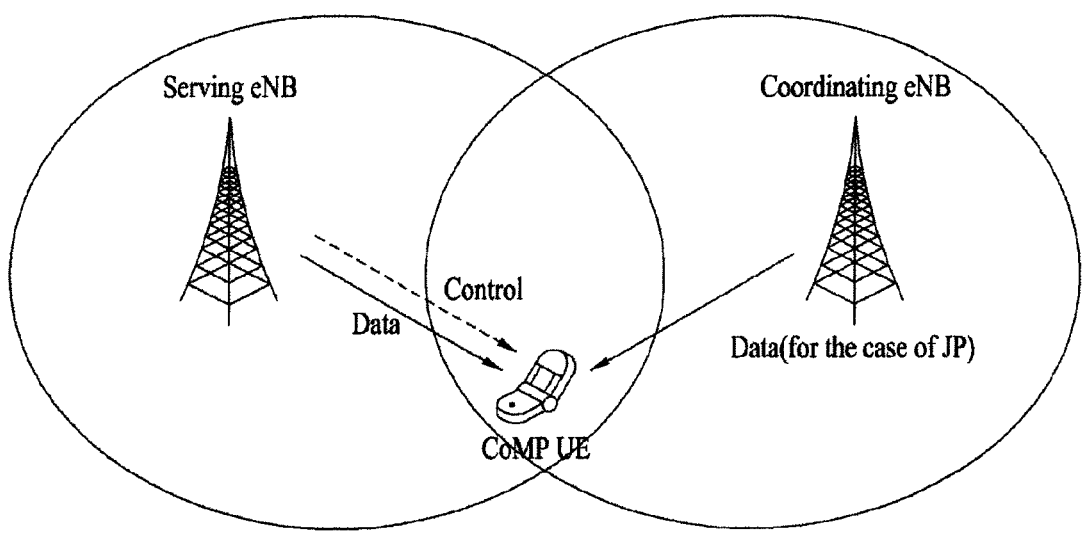
FIG. 14 is a diagram for an example of a CoMP operation according to embodiment of the present invention.

FIG. 14 is a diagram for an example of a CoMP operation according to embodiment of the present invention. In particular, FIG. 14 assumes that a JP scheme is applied among CoMP operation.

FIG. 14 is a diagram for an example of a CoMP operation. Referring to FIG. 14, a UE operates by receiving control information from a serving eNB (S-eNB) and data are transmitted from the S-eNB and a coordinating eNB (C-eNB) at the same time. On the contrary, although it is not depicted, in case of a CS/CB scheme, data is transmitted from the S-eNB only. In case of DPS (dynamic point selection), data is transmitted from an eNB dynamically selected in the CoMP measurement set only.

Although FIG. 14 shows an example that there is a single C-eNB, the present invention can be generally applied to the CoMP measurement set at which a plurality of C-eNBs exist. The present invention can also be applied to an inter-site CoMP structure where an S-eNB and a C-eNB exist in a manner of being geographically apart from each other, an intra-site CoMP structure where all eNBs included in the CoMP measurement set exist at an identical position (co-located) (e.g., a CoMP structure between co-located sector antennas), or a heterogeneous network structure including a hybrid form of the aforementioned structures.

Since CSI feedback for a CoMP operation adds additional CSI feedback for a C-eNB compared to a single cell-based non-CoMP CSI, it may be required a great amount of feedback bits. Hence, in case of performing feedback via PUSCH rather than performing all CoMP CSI feedback via a PUCCH-based periodic CSI report, since it is able to transmit a great amount of information at a time, it is more profitable in terms of the CoMP CSI feedback.

In particular, the present invention assumes a situation that a UE operating in a CoMP mode aperiodically reports CoMP CSI feedback by utilizing PUSCH. In this case, the feedback via PUSCH can be aperiodically triggered by an S-eNB or can be applied in a PUSCH-based periodic CSI feedback form, which is triggered via upper layer signaling and the like in advance.

According to the present invention, as shown in Table 8 in the following, if two or more bits are assigned as a size of a triggering bit of a specific DCI, the present invention proposes a scheme of defining and managing a default A-CSI triggering state together with a state indicating that a CSI report is not triggered, i.e., "No aperiodic CSI report is triggered" to avoid ambiguity when RRC of each CSI process is reconfigured.

In Table 8 in the following, the default A-CSI triggering state is defined by such a state as "Aperiodic CSI report triggered for PDCCH-transmitting TP(s) in serving-cell c". In this case, "PDCCH-transmitting TP(s) in serving-cell c" may mean one or more TPs transmitting PDCCH on a downlink carrier linked with (i.e., SIB2-linked) an uplink carrier indicated by uplink-related DCI (e.g., DCI including an uplink grant) by system information in a wireless communication system to which a carrier aggregation scheme is applied. Or, the state may mean one or more TPs transmitting a CRS on a downlink carrier. Of course, if a cross-carrier scheduling is applied, a downlink carrier receiving uplink-related DCI and a downlink carrier linked by system information may be different from each other.

Table 8 in the following shows an example of a scheme proposed by the present invention in case that an A-CSI triggering bit is configured by 2-bit. If the A-CSI triggering bit corresponds to '00', it indicates that there is no A-CSI feedback request. If the A-CSI triggering bit corresponds to '01', it indicates that an A-CSI report is requested by one or more TPs transmitting PDCCH on a downlink carrier linked by the system information. A CSI report of a first set or a CSI report of a second set configured via such upper layer signal as RRC signaling in advance is mapped to each of other states. In this case, the first set or the second set may include one or more TPs.

TABLE 8

| Value of CoMP CSI request field | Description |
|---|---|
| 00 | No aperiodic CSI report is triggered |
| 01 | Aperiodic CSI report triggered for PDCCH-transmitting TP(s) in serving-cell c |
| 10 | Aperiodic CSI report is triggered for a $1^{st}$ set of TPs configured by higher layers |
| 11 | Aperiodic CSI report is triggered for a $2^{nd}$ set of TPs configured by higher layers |

Referring to Table 8, such a default state as '01' state can be defined to play a role of a default A-CSI triggering state appropriated for both a carrier aggregation scheme and a CoMP scheme for a UE to which the carrier aggregation scheme and the CoMP scheme are set at the same time.

For instance, as shown in Table 8, if '01' state is defined and A-CSI triggering is transmitted for a specific uplink-related DCI, such a default state as the '01' may be interpreted as a meaning of designating a downlink carrier linked with a uplink carrier, which schedules via the uplink-related DCI, by system information in terms of the CA scheme and as a meaning of aperiodic reporting of CSI reported by one or more TPs transmitting PDCCH on a corresponding downlink carrier in a CoMP measurement set, which exists in response to the downlink carrier, to a serving eNB in terms of the CoMP scheme.

In this case, in order to calculate CSI of one or more TPs transmitting PDCCH on the downlink carrier, if information indicating that a CSI-RS antenna port belonging to a specific CSI-RS resource among a plurality of CSI-RS resources capable of being set to a single UE is Quansi co-located (QCL) with a CRS on the downlink carrier is given, it is preferable to calculate the CSI using the specific CSI-RS resource.

If a plurality of TPs transmit a CRS using an identical cell identifier like an MBSFN (multicast broadcast single frequency network) does, a specific CSI-RS antenna port capable of assuming QCL with an MBSFN-like CRS antenna port can be set to a UE via upper layer signaling and the like.

For instance, in case of the CSI-RS port similar to a CRS, a plurality of TPs including an identical cell identifier can transmit an identical CSI-RS sequence in an MBSFN form like an MBSFN does. A UE measuring the MBSFN-like CSI-RS may be able to identically or similarly reflect a channel carrying PDCCH, which is transmitted via a CRS. Hence, since it is able to indicate the default state shown in Table 8 without a problem, setting the default state may become a state suitable for a purpose of considering the carrier aggregation scheme and the CoMP scheme at the same time.

And, although a plurality of TPs include an identical cell identifier, it may consider a system that such a representative TP as a macro eNB transmits a CSR and PDCCH only. In this case, the default state can be interpreted as a meaning of reporting A-CSI on the representative TP. Yet, information on a CSI-RS antenna port capable of assuming QCL with such an antenna port of a specific reference signal used for transmitting PDCCH as a specific CRS port should be provided to a UE in advance via upper layer signaling or dynamic signaling.

Meanwhile, if information on a CSI-RS antenna port capable of assuming QCL with a CRS antenna port used for transmitting PDCCH is provided, a signal measurement, i.e., S-measure can be performed. Yet, in case that a specific IMR should be indicated to measure interference, in particular, in case of I-measure, it is preferable to include information on whether an antenna port to which a specific IMR (interference measurement resource) or an IMRE (interference measurement resource element) is set is able to assume QCL with an antenna port of a different reference signal (e.g., a CSR, a CSI-RS, a DMRS) in IMR configuration information.

Hence, the present invention proposes to designate an antenna port of a specific reference signal capable of assuming QCL with an antenna port to which an IMR is set (or a specific antenna port not transmitting an interference signal received/measured by the IMR or an antenna port for S-measure forming a pair with I-measure via the IMR) via upper layer signaling or dynamic signaling.

First of all, available QCL assumption between a specific IMR port and a specific reference signal port can be defined as follows. In case of QCL with such a reference signal as a CRS, a CSI-RS and a DMRS, it means that a UE can derive large-scale properties of a signal received from the IMR port from a signal received from the port of the reference signal. Consequently, it may mean that all or some of the large-scale properties of the signal received from the IMR port are identical to large-scale properties of the signal received from the port of the reference signal.

In this case, the large-scale properties includes Doppler spread related to a frequency offset, Doppler shift, average delay related a timing offset, delay spread and the like. Moreover, the large-scale properties may include an average gain as well. In addition, information on whether a specific IMR port is independently configured according to a specific TP can also be included in the large-scale properties. In particular, since information on a TP to which a specific IMR port belongs is able to know via an IMR configuration, QCL assumption with the TP is naturally available and it may also be recognized as the TP transmits a signal to the IMR port. This sort of characteristic can be represented as a FFT (Fast Fourier transform) timing.

If information indicating that QCL assumption between an IMR port and a specific RS port transmitting PDCCH is available in a specific IMR configuration is delivered, in case of calculating CSI on one or more TPs transmitting the PDCCH, I-measure may use a specific IMR port to which the information indicating that QCL assumption is available with a specific reference signal transmitting the PDCCH is provided. Or, in case of the I-measure, it may be always defined as calculating CSI on one or more TPs transmitting the PDCCH using the specific IMR configuration. Or, the IMR configuration can be explicitly designated via upper layer signaling or dynamic signaling.

As a different embodiment of the present invention, such a default A-CSI triggering state as "Aperiodic CSI report triggered for all CSI process(es) configured for the CoMP measurement set in serving-cell c" can be defined as shown in Table 9 in the following. In case of receiving uplink-related DCI triggering a corresponding A-CSI, the aforementioned default state may be interpreted as a meaning of reporting A-CSI for all CSI processes of a corresponding CoMP measurement set in response to a downlink carrier linked with a uplink carrier, which is scheduled by the DCI, by system information. In particular, all CSI processes of the CoMP measurement set may include CSI processes for the CoMP measurement set configured by upper layer signaling in advance. Or, all CSI processes of the CoMP measurement set may mean all CSI processes configured in response to the CoMP measurement set.

TABLE 9

| Value of CoMP CSI request field | Description |
| --- | --- |
| 00 | No aperiodic CSI report is triggered |
| 01 | Aperiodic CSI report triggered for all CSI process(s) configured for the CoMP measurement set in serving-cell c |
| 10 | Aperiodic CSI report is triggered for a $1^{st}$ set of serving cells(and/or TPs) configured by higher layers |
| 11 | Aperiodic CSI report is triggered for a $2^{nd}$ set of serving cells(and/or TPs) configured by higher layers |

Figure 15:
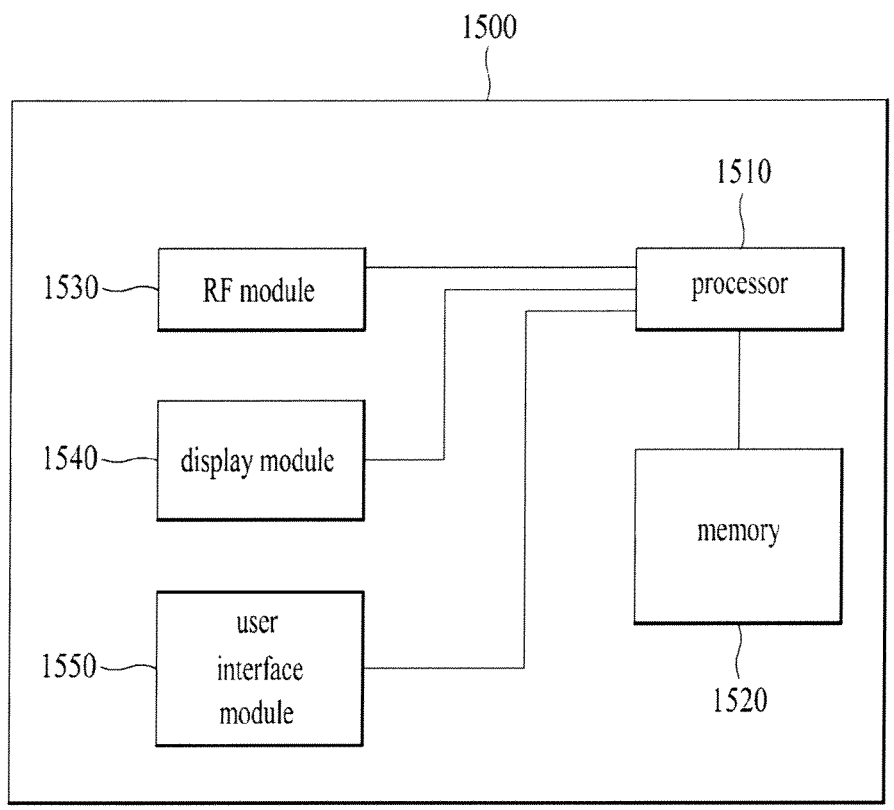
FIG. 15 is a block diagram for an example of a communication device according to one embodiment of the present invention.

FIG. 15 is a block diagram for an example of a communication device according to one embodiment of the present invention.

Referring to FIG. 15, a communication device 1500 may include a processor 1510, a memory 1520, an RF module 1530, a display module 1540, and a user interface module 1550.

Since the communication device 1500 is depicted for clarity of description, prescribed module(s) may be omitted in part. The communication device 1500 may further include necessary module(s). And, a prescribed module of the communication device 1500 may be divided into subdivided modules. A processor 1510 is configured to perform an operation according to the embodiments of the present invention illustrated with reference to drawings. In particular, the detailed operation of the processor 1510 may refer to the former contents described with reference to FIG. 1 to FIG. 14.

The memory 1520 is connected with the processor 1510 and stores an operating system, applications, program codes, data, and the like. The RF module 1530 is connected with the processor 1510 and then performs a function of converting a baseband signal to a radio signal or a function of converting a radio signal to a baseband signal. To this end, the RF module 1530 performs an analog conversion, amplification, a filtering, and a frequency up conversion, or performs processes inverse to the former processes. The display module 1540 is connected with the processor 1510 and displays various kinds of informations. And, the display module 1540 can be implemented using such a well-known component as an LCD (liquid crystal display), an LED (light emitting diode), an OLED (organic light emitting diode) display and the like, by which the present invention may be non-limited. The user interface module 1550 is connected with the processor 1510 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then driveable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of reporting aperiodic channel status information in a multi cell-based wireless communication system and an apparatus therefore are described with reference to examples applied to 3GPP LTE system, it may be applicable to various kinds of wireless communication systems as well as the 3GPP LTE system.

What is claimed is:
1. A method of reporting channel status information at a user equipment in a base station cooperative wireless communication system, the method comprising:
receiving first resource configuration information for a channel status information-reference signal (CSI-RS) and second resource configuration information for interference measurement from a serving base station;
receiving a triggering signal from the serving base station to report the channel status information;
calculating the channel status information on at least one of the serving base station and one or more cooperative base stations using the first resource configuration information and the second resource configuration information; and reporting the channel status information to the serving base station, wherein the first resource configuration information and the second resource configuration information comprises information on an antenna port capable of referring a large scale property of a radio channel.

2. The method of claim 1, wherein the triggering signal indicates one of a plurality of triggering states and wherein a plurality of the triggering states comprise a state indicating a reporting of the channel status information on a base station that transmits a downlink control channel on a specific frequency band.

3. The method of claim 1, wherein the second resource configuration information comprises resource element information indicating a position of one or more resource elements and wherein the information on the antenna port contained in the second resource configuration information corresponds to information on an antenna port of a reference signal assuming that the position of one or more resource elements and the large scale property are identical to each other.

4. The method of claim 1, wherein the information on the antenna port contained in the first resource configuration information corresponds to information on an antenna port of a different reference signal assuming that the channel status information-reference signal and the large scale property are identical to each other.

5. The method of claim 1, wherein the large scale property corresponds to information on frequency offset for synchronization tracking and information on timing offset.

6. The method of claim 1, wherein the large scale property comprises at least one selected from the group consisting of Doppler spread, Doppler shift, average delay and delay spread.

7. A terminal device in a base station cooperative wireless communication system, the terminal device comprising:

a wireless communication module configured to transceive a signal with a serving base station and one or more cooperative base stations; and a processor configured to process the signal, wherein the wireless communication module is configured to receive first resource configuration information for a channel status information-reference signal (CSI-RS) and second resource configuration information for interference measurement from the serving base station and receive a triggering signal from the serving base station to report the channel status information, wherein the processor is configured to calculate the channel status information on at least one of the serving base station and one or more cooperative base stations using the first resource configuration information and the second resource configuration information and control the wireless communication module to report the channel status information to the serving base station and wherein the first resource configuration information and the second resource configuration information comprises information on an antenna port capable of referring a large scale property of a radio channel.

8. The terminal device of claim 7, wherein the triggering signal indicates one of a plurality of triggering states and wherein a plurality of the triggering states comprise a state indicating a reporting of the channel status information on a base station that transmits a downlink control channel on a specific frequency band.

9. The terminal device of claim 7, wherein the second resource configuration information comprises resource element information indicating a position of one or more resource elements and wherein the information on the antenna port contained in the second resource configuration information corresponds to information on an antenna port of a reference signal assuming that the position of one or more resource elements and the large scale property are identical to each other.

10. The terminal device of claim 7, wherein the information on the antenna port contained in the first resource configuration information corresponds to information on an antenna port of a different reference signal assuming that the channel status information-reference signal and the large scale property are identical to each other.

11. The terminal device of claim 7, wherein the large scale property corresponds to information on frequency offset for synchronization tracking and information on timing offset.

12. The terminal device of claim 7, wherein the large scale property comprises at least one selected from the group consisting of Doppler spread, Doppler shift, average delay and delay spread.

* * * * *